(12) United States Patent
Richter et al.

(10) Patent No.: US 10,926,834 B2
(45) Date of Patent: Feb. 23, 2021

(54) ASSISTIVE DRIVING SYSTEM FOR A WHEELCHAIR AND METHOD FOR CONTROLLING ASSISTIVE DRIVING SYSTEM

(71) Applicant: Max Mobility, LLC, Antioch, TN (US)

(72) Inventors: Mark Richter, Nashville, TN (US); Benjamin Phillip Hemkens, Nashville, TN (US); William Alexander Emfinger, Nashville, TN (US); Liyun Guo, Brentwood, TN (US)

(73) Assignee: Max Mobility, LLC, Lebanon, TN (US)

(*) Notice: Subject to any disclaimer, the term of this patent is extended or adjusted under 35 U.S.C. 154(b) by 35 days.

(21) Appl. No.: 16/203,032

(22) Filed: Nov. 28, 2018

(65) Prior Publication Data

US 2019/0176931 A1    Jun. 13, 2019

Related U.S. Application Data

(63) Continuation of application No. 15/839,519, filed on Dec. 12, 2017, now Pat. No. 10,167,051.

(51) Int. Cl.
*B62M 6/50* (2010.01)
*A61G 5/02* (2006.01)
*A61G 5/04* (2013.01)
*H02P 31/00* (2006.01)

(52) U.S. Cl.
CPC ............... *B62M 6/50* (2013.01); *A61G 5/02* (2013.01); *A61G 5/027* (2013.01); *A61G 5/028* (2013.01); *A61G 5/047* (2013.01); *A61G 5/048* (2016.11); *A61G 2203/30* (2013.01); *A61G 2203/36* (2013.01); *H02P 31/00* (2013.01)

(58) Field of Classification Search
CPC .......... B62M 6/50; A61G 5/027; A61G 5/028; A61G 5/02; A61G 5/047; A61G 2203/36; A61G 5/048; A61G 2203/30; H02P 31/00
See application file for complete search history.

(56) References Cited

U.S. PATENT DOCUMENTS

| | | | |
|---|---|---|---|
| 2,448,992 | A | 9/1948 | Love et al. |
| 2,495,573 | A | 1/1950 | Duke |
| 3,905,437 | A | 9/1975 | Kaiho et al. |
| 4,207,959 | A | 6/1980 | Youdin et al. |
| 4,260,035 | A | 4/1981 | Loveless et al. |
| 4,386,672 | A | 6/1983 | Coker |
| 4,422,515 | A | 12/1983 | Loveless |

(Continued)

FOREIGN PATENT DOCUMENTS

| | | |
|---|---|---|
| DE | 300247 | 1/1917 |
| DE | 4323937 | 7/1993 |

(Continued)

OTHER PUBLICATIONS

Espacenet translation of KR 0089860(A), published Aug. 5, 2015, Lee et al, 8 pages, CPC A61G5/10 (Year: 2015).*

(Continued)

*Primary Examiner* — Dale W Hilgendorf
(74) *Attorney, Agent, or Firm* — McAndrews, Held & Malloy, Ltd.

(57) ABSTRACT

The present disclosure describes a system and method for a providing an assistive driving force to a wheelchair.

20 Claims, 6 Drawing Sheets

(56) References Cited

U.S. PATENT DOCUMENTS

| | | | |
|---|---|---|---|
| 4,652,026 | A | 3/1987 | Byrge |
| 4,728,812 | A | 3/1988 | Sheriff et al. |
| 4,759,418 | A | 7/1988 | Goldenfeld et al. |
| 4,767,940 | A | 8/1988 | Tuttle |
| 4,770,431 | A | 9/1988 | Kulik |
| 4,823,900 | A | 4/1989 | Farnam |
| 4,926,952 | A | 5/1990 | Farnam |
| 5,113,959 | A | 5/1992 | Mastov et al. |
| 5,135,063 | A | 8/1992 | Kropf |
| 5,222,567 | A | 6/1993 | Broadhead et al. |
| 5,234,066 | A | 8/1993 | Ahsing et al. |
| 5,244,051 | A | 9/1993 | Wu |
| 5,351,774 | A | 10/1994 | Okamoto |
| 5,366,037 | A | 11/1994 | Richey |
| 5,494,126 | A | 2/1996 | Meeker |
| 5,555,949 | A | 9/1996 | Stallard et al. |
| 5,651,422 | A | 7/1997 | Casali |
| 5,818,189 | A | 10/1998 | Uchiyama |
| 5,826,670 | A | 10/1998 | Nan |
| 5,878,829 | A | 3/1999 | Kanno et al. |
| 5,927,414 | A | 7/1999 | Kan et al. |
| 6,059,060 | A | 5/2000 | Kanno et al. |
| 6,112,837 | A | 9/2000 | Kanno et al. |
| 6,230,831 | B1 | 5/2001 | Ogata et al. |
| 6,290,014 | B1 | 9/2001 | MacCready, Jr. |
| 6,302,226 | B1 | 10/2001 | Kanno et al. |
| 6,334,497 | B2 | 1/2002 | Odell |
| 6,354,390 | B1 | 3/2002 | Uchiyama et al. |
| 6,360,836 | B1 | 3/2002 | Milano, Jr. et al. |
| 6,416,063 | B1 | 7/2002 | Stillinger et al. |
| 6,459,962 | B2 | 10/2002 | Ulrich et al. |
| 6,481,514 | B2 | 11/2002 | Takada |
| 6,571,892 | B2 | 6/2003 | Kamen et al. |
| 6,702,051 | B2 | 3/2004 | Chu et al. |
| 6,729,421 | B1 | 5/2004 | Gluck et al. |
| 6,729,422 | B2 | 5/2004 | Chu et al. |
| 6,807,465 | B2 | 10/2004 | Ulrich et al. |
| 6,842,692 | B2 | 1/2005 | Fehr et al. |
| 6,860,347 | B2 | 3/2005 | Sinclair et al. |
| 6,880,661 | B1 | 4/2005 | Oh |
| 7,138,774 | B2 | 11/2006 | Negoro et al. |
| 7,264,272 | B2 | 9/2007 | Mulhern et al. |
| 7,311,160 | B2 | 12/2007 | Lim |
| 7,383,107 | B2 | 6/2008 | Fehr et al. |
| 7,383,904 | B2 | 6/2008 | Wu |
| 7,404,465 | B2 | 7/2008 | Hsieh |
| 7,425,007 | B2 | 9/2008 | Johannes de Kruijf |
| 7,426,970 | B2 | 9/2008 | Olsen |
| 7,566,102 | B2 | 7/2009 | Guile |
| 7,581,604 | B2 | 9/2009 | Torita |
| 7,648,156 | B2 | 1/2010 | Johanson |
| 7,670,263 | B2 | 3/2010 | Ellis et al. |
| 7,770,674 | B2 | 8/2010 | Miles et al. |
| 7,832,515 | B2 | 11/2010 | Barthelt |
| 7,837,210 | B2 | 11/2010 | Kylstra et al. |
| 7,886,854 | B2 | 2/2011 | Chiu |
| 7,976,049 | B2 | 7/2011 | Chiu |
| 8,038,165 | B2 | 10/2011 | Wang |
| 8,127,875 | B2 | 3/2012 | Mattes et al. |
| 8,181,992 | B2 | 5/2012 | Mulhern et al. |
| 8,186,463 | B2 | 5/2012 | Hunziker et al. |
| 8,261,867 | B1 | 9/2012 | Gainer |
| 8,292,010 | B2 | 10/2012 | Puskar-Pasewicz et al. |
| 8,292,678 | B2 | 10/2012 | Burgess, Jr. |
| 8,306,673 | B1 | 11/2012 | Manning |
| 8,413,749 | B2 | 4/2013 | Hsu |
| 8,430,189 | B2 | 4/2013 | Tallino |
| 8,556,279 | B2 | 10/2013 | McKinnon |
| 8,602,138 | B2 | 12/2013 | Filkoski et al. |
| 8,652,009 | B2 | 2/2014 | Ellis et al. |
| 8,758,191 | B2 | 6/2014 | Takenaka et al. |
| 9,144,525 | B2 | 9/2015 | Richter |
| 9,398,990 | B2 | 7/2016 | Richter |
| 9,615,982 | B2 | 4/2017 | Richter |
| 9,795,524 | B2 | 10/2017 | Richter |
| 9,796,401 | B1 | 10/2017 | Ammirati et al. |
| 10,265,228 | B2 | 4/2019 | Richter |
| 2002/0019686 | A1 | 2/2002 | Ulrich |
| 2002/0036105 | A1 | 3/2002 | Birmanns |
| 2002/0171559 | A1 | 11/2002 | Yang |
| 2003/0127261 | A1 | 7/2003 | Borroni-Bird et al. |
| 2003/0226698 | A1 | 12/2003 | Kamen et al. |
| 2004/0251649 | A1 | 12/2004 | Wu |
| 2005/0000742 | A1 | 1/2005 | Mulhern |
| 2005/0077694 | A1 | 4/2005 | Levi et al. |
| 2005/0137652 | A1 | 6/2005 | Cauller et al. |
| 2005/0236208 | A1 | 10/2005 | Runkles et al. |
| 2006/0244249 | A1 | 11/2006 | Goertzen et al. |
| 2006/0255581 | A1 | 11/2006 | Goertzen et al. |
| 2007/0020985 | A1 | 1/2007 | Naitou et al. |
| 2007/0039766 | A1 | 2/2007 | Jackson et al. |
| 2007/0095580 | A1 | 5/2007 | Liao |
| 2007/0095582 | A1 | 5/2007 | Stuijt et al. |
| 2007/0131730 | A1 | 6/2007 | Mirzale |
| 2007/0145711 | A1 | 6/2007 | Mulhern et al. |
| 2007/0152427 | A1 | 7/2007 | Olsen |
| 2007/0235234 | A1 | 10/2007 | De Kruijf |
| 2007/0261897 | A1 | 11/2007 | Torita |
| 2007/0283966 | A1 | 12/2007 | Maples |
| 2008/0054596 | A1 | 3/2008 | Johanson |
| 2008/0061627 | A1 | 3/2008 | Spector et al. |
| 2008/0066974 | A1 | 3/2008 | Pearlman et al. |
| 2008/0300777 | A1 | 12/2008 | Fehr et al. |
| 2009/0050381 | A1 | 2/2009 | Cheng |
| 2009/0194974 | A1 | 8/2009 | Smith |
| 2010/0022908 | A1 | 1/2010 | Cauller |
| 2010/0036543 | A1 | 2/2010 | Bitzer et al. |
| 2010/0300777 | A1 | 12/2010 | Tallino |
| 2010/0301576 | A1 | 12/2010 | Dugas et al. |
| 2011/0199393 | A1* | 8/2011 | Nurse et al. ............ A43B 3/00 345/665 |
| 2011/0214929 | A1 | 9/2011 | Filkoski et al. |
| 2012/0012416 | A1 | 1/2012 | Mirzaie |
| 2012/0068435 | A1 | 3/2012 | Birmanns et al. |
| 2012/0080243 | A1 | 4/2012 | Mulhern |
| 2012/0138376 | A1 | 6/2012 | Zhou et al. |
| 2012/0143400 | A1 | 6/2012 | Hinkel, III |
| 2012/0144554 | A1 | 6/2012 | Thellmann |
| 2012/0217081 | A1 | 8/2012 | Mulhern et al. |
| 2012/0217713 | A1 | 8/2012 | Molnar |
| 2013/0008732 | A1 | 1/2013 | Richter |
| 2013/0080015 | A1 | 3/2013 | Strothmann et al. |
| 2013/0205501 | A1 | 8/2013 | Robertson et al. |
| 2013/0218380 | A1 | 8/2013 | Phillips et al. |
| 2013/0240271 | A1 | 9/2013 | Tallino |
| 2013/0253769 | A1 | 9/2013 | Kamo et al. |
| 2014/0058582 | A1 | 2/2014 | Jaenke et al. |
| 2014/0262575 | A1 | 9/2014 | Richter |
| 2015/0298765 | A1* | 10/2015 | Golden, Jr. ............ A61G 5/047 180/206.3 |
| 2015/0351980 | A1* | 12/2015 | Richter .................. A61G 5/047 180/167 |
| 2015/0357948 | A1 | 12/2015 | Goldstein |
| 2016/0242977 | A1* | 8/2016 | Richter ................... B62M 6/50 |
| 2017/0027785 | A1 | 2/2017 | Richter |
| 2017/0189249 | A1* | 7/2017 | Wu ........................ A61G 5/047 |
| 2017/0347885 | A1 | 12/2017 | Tan et al. |

FOREIGN PATENT DOCUMENTS

| | | |
|---|---|---|
| DE | 19748201 | 3/1999 |
| DE | 19857786 | 9/1999 |
| DE | 29907846 | 9/1999 |
| DE | 19848530 | 2/2000 |
| DE | 102007004704 | 8/2008 |
| EP | 1854443 | 11/2007 |
| JP | 06304205 | 11/1994 |
| JP | 09285501 | 11/1997 |
| JP | 10314234 | 12/1998 |
| JP | 2000084007 | 3/2000 |
| JP | 2003052760 | 2/2003 |

(56) References Cited

FOREIGN PATENT DOCUMENTS

| JP | 2009078044 | 4/2009 |
|---|---|---|
| WO | 2013006818 | 1/2013 |

OTHER PUBLICATIONS

International Search Report and Written Opinion for PCT/US2018/064935, dated Jan. 3, 2019 (15 pages).
Lutin. Smart Drive Power Assist Wheel Demo. YouTube. Oct. 23, 2012. Retrieved from internet: <URL:http://www.youtube.com/watch?v=3RbaFns4iXQ>.
Mayton et al., (B. D. Mayton, N. Zhao, M. Aldrich, N. Gillian and J. A. Paradisco, "WristQue: A personal sensor wristband," Body Sensor Networks (BSN), 2013 IEEE International Conference on, Cambridge, MA, USA, 2013, pp. 1-6, URL: http://ieeexplore.ieee.org/stamp/stamp.jsp?tp=&arnumber=6575483&isnumber=6575455.
Takashi Miyazawa, Seiichirou Katsura, Kouhei Ohnishi, A Power-Assisted Wheelchair Taking Running Environment Into Account, Copyright 2003 IEEE, 6 pages.
Rick N. Robertson, PhD. Michael L. Boninger, MD, Rory A. Cooper, PhD., Sean D. Shimada, MS, Pushrim Forces and Joint Kinetics During Wheelchair Propulsion, Arch Phys Med Rehabil, vol. 77, Sep. 1996, 9 pages.
Jonas Johanssen, Daniel Petersson, Torque Sensor Free Power Assisted Wheelchair, Master's Thesis in Electrical Engineering, School of Information Science, Computer and Electrical Engineering, Halmstad University, Technical Report, IDE0703, Jan. 2007, 78 pages.
Sehoon Oh, Yoichi Hori, Sensor Free Power Assisting Control Based on Velocity Control and Disturbance Observer, IEEE ISIE 2005, Jun. 20-23, 2005, Dubrovnik, Croatia, 6 pages.
Espacenet translation of KR20150089860(A) published Aug. 5, 2015, Lee et al., 8 pages, CPC A61G5/10 (Year: 2015).
Brian D. Mayton, WristQue: A Personal Sensor Wristband for Smart Infrastructure and Control, submitted to the Program in Media Arts and Sciences, School of Architecture and Planning on Oct. 9, 2012, 72 pages.
Daniel Petersson, Jonas Johanssen, Ulf Holmberg and Bjorn Astrand, Torque Sensor Free Power Assisted Wheelchair, Proceedings of the 2007 IEEE 10th International Conference on Rehabilitation Robotics, Jun. 12-15, Noordwijk, The Netherlands, Jun. 12-15, 2007, Paper 7 pages, Abstract 1 page, Table of Contents 10 pages, and Halmstad University Post-Print 1 page, Total of 19 pages.
Sunrise Medical, WheelDrive manual, TM_WheelDrive_EU_INT_Rev.2.0_2016_10_13, 32 pages.
Sunrise Medical GmbH, GER, Model: Krypton, product sheet for EU Market, 2 pages.
Max Mobility, Installation guide for adapter axis, 2 pages.
Sunrise Medical, WheelDrive, Brochure, 8 pages.
E-Move, Decon product brochure, 9 pages.
Alber GmbH, Twion Brochure, 12 pages.
Alber GmbH, e-motion brochure, 8 pages.
Alber GmbH, e-fix, 8 pages.

* cited by examiner

ASSISTIVE DRIVING SYSTEM FOR A WHEELCHAIR AND METHOD FOR CONTROLLING ASSISTIVE DRIVING SYSTEM

This application is a continuation of U.S. patent application Ser. No. 15/839,519, filed Dec. 12, 2017, the entirety of which is incorporated by reference herein.

BACKGROUND

Manual wheelchairs are the primary mode of locomotion for millions of people around the world. Upper limb pain and injury is very common among these manual wheelchair users and can severely impact mobility, independence, and quality of life. The most common types of injury are impingement syndrome of the shoulder and carpal tunnel syndrome of the wrist. Upper limb pain and injury is an emotionally, physically, and financially costly problem.

Wheelchair propulsion is one activity that has been associated with the development of these upper extremity injuries. It is recommended that users reduce how hard they push on the hand rim and to do it less frequently in order to reduce the stresses of propulsion on the upper body.

Power attachment units can mount to manual wheelchairs to assist in propulsion. An example of one such power add-on is disclosed in U.S. Pat. No. 4,759,418, which employs a linkage system that mounts to the wheelchair frame and trails in between the two rear wheels. An electric motor powers a drive wheel that is controlled by a push button located within reach of the user. This type of design, not common to all power attachments, also employs a steering bar that attaches to the front casters in order to guide the wheelchair when being driven by the power add-on. These electric drive attachments are known to be successful in helping to reduce the physical effort needed for propulsion. A drawback is that these types of systems completely eliminate the need for pushing because the user drives the wheelchair, rather than maneuvers it through pushes. In this situation, the user does not benefit from the physical exercise of manual propulsion or the psychological benefits of not being dependent on the device for transportation.

Another example of a power attachment device is push-activated power assist wheels. These combine the benefits of manual push operation by the user and power assistance to reduce the demand on the user's upper extremities during propulsion. Push-activated power assist wheels, similar to those disclosed in U.S. Pat. No. 5,818,189, are battery powered wheels that employ either force or torque sensors, or both, to measure the force applied to the hand rims from the user and amplify that force through the use of motors embedded in the wheels to drive the wheelchair forward or backward. This technology has been shown to have a number of positive effects on wheelchair users, including reduced energy expenditure, reduced push cadence, reduced muscle activation, decreased range of motion, easier hill climbing, increased propulsion speed, and reduced pain during propulsion for those users already experiencing pain. One drawback with this approach, however, is that the employment of force and torque sensors to recognize and quantify the amplitude of the push significantly complicates the design, adding costs and weight. Additionally, because measurements are focused on the hand rim, hazardous situations can be escalated by the assistive power.

Another power assistance system is disclosed in U.S. Patent Application Publication No. 2013/0008732 A1, the entirety of which is incorporated herein by reference. The motion-based push activation power assist system disclosed in U.S. Patent Application Publication No. 2013/0008732 A1 uses motion-based measurements to determine when the user applies a push to the wheelchair hand rims and brakes with the hand rims. The push recognition activates a drive system that provides an assistive driving force to the wheelchair to reduce the demand on the user during propulsion. The brake recognition deactivates the power assist. The provided power assist is proportional to the sensed push and can be modulated to different proportional settings.

A motion assistance system for driving a wheelchair is also disclosed in US Patent Application Publication No. 2014/0262575 A1, the entirety of which is incorporated herein by reference. In certain embodiments of the system disclosed in US Patent Application Publication No. 2014/0262575 A1, a user may control a motion assistance system through a control switch, The control switch may be located on or around the seat or on the push rim of the wheelchair. The control switch may also be a remote control, including for example a wrist remote control that can be worn on the wrist or forearm of a user. The user may thus activate and/or deactivate the motion assistance system by pressing a button, activating a switch, pressing onto a throttle, and the like.

Another assistive driving system for a wheelchair is disclosed in U.S. Patent Application Publication No. 2016/0242977 A1, the entirely of which is incorporated herein by reference. In embodiments of the system disclosed in U.S. Patent Application Publication No. 2016/0242977 A1, an assistive drive force is activated based on the combination of (a) an acceleration of the power assist system (attached to the wheelchair) and (b) a user motion that indicates that the user has applied a manual push to the wheelchair, as detected by a sensor worn by the user. Similarly, an assistive drive force may be deactivated based on the combination of (a) a deceleration of the power assist system and (b) a user motion that indicates that the user has applied a manual brake to the wheelchair, as detected by a sensor worn by the user. Accordingly, embodiments of the assistive driving system disclosed in U.S. Patent Application Publication No. 2016/0242977 A1 protects against the unintended activation and/or deactivation of a power assist system that could result from the use of acceleration and/or deceleration data alone.

Certain aspects of the presently disclosed system provide an improved power assistance system that gives a user an enhanced degree of control over the activation and deactivation of an assistive driving force.

SUMMARY

The present disclosure describes a system and method for providing an assistive driving force to a wheelchair. In certain aspects, the system comprises a power assist drive system capable of providing the wheelchair with an assistive drive force. The system also comprise an element configured to be worn on a user's hand or wrist and which comprises a sensor, the sensor being configured to detect the motion (e.g. acceleration) of a user's hand. The system may be configured so that data from the sensor is communicated, e.g. wirelessly, to the power assist drive system. The system may also comprise a processor configured to receive data from the sensor, process that data, and activate or deactivate the power assist drive system in response to certain data. The processor may be a component of the power assist drive system that is attached to the wheelchair, a component of the wearable element, or a combination of processors (e.g. a first processor that is a component of the power assist drive system and a second processor that is a component of the wearable element).

In some embodiments, the processor may be configured to activate an assistive drive force in response to a user's double-tapping of a hand against a hand rim of the wheelchair. For instance, the processor may be configured to activate the power assist drive system in response to the detection of at least a first and second acceleration, the second acceleration occurring within a defined period of time after the first acceleration. It may also be required that the first and second accelerations be along an axis that is substantially normal, or perpendicular, to a user's palm and meet a threshold magnitude, the combination of which is indicative of a user tapping a hand against a hand rim of a wheelchair.

In some embodiments, once the wheelchair is being propelled by an assistive driving force, the processor may also be configured to deactivate the assistive drive force in response to a user's double-tapping of a hand against a hand rim of the wheelchair. For instance, the processor may also be configured to deactivate the power assist drive system in response to the detection of at least a first and second acceleration, the second acceleration occurring within a defined period of time after the first acceleration. It may also be required that the first and second accelerations be along an axis that is substantially normal, or perpendicular, to a user's palm and meet a threshold magnitude, the combination of which is indicative of a user tapping a hand against a hand rim of a wheelchair.

In some embodiments, the system may also be configured so that a user may set the level, or speed, of the assistive driving force by a user motion that can be detected by the sensor, e.g. a single tap of a hand against a hand rim of the wheelchair. For instance, upon activation of the power assist drive system, the processor may be configured to gradually increase the level of the assistive drive force until another acceleration is detected by the sensor, the acceleration being along an axis that is substantially normal, or perpendicular, to a user's palm and meeting a threshold magnitude.

In some embodiments, the processor may be configured to activate the power assist drive system in response to the detection of a first user motion, increase the level of the assistive drive force until either (a) a maximum level is reached or (b) the detection of a second user motion, and deactivate the power assist drive system in response to the detection of a third user motion. The first user motion and the third user motion may be substantially the same. For instance, the first user motion and the third user motion may each comprise a double tap of a user's hand against a hand rim of the wheelchair, such as may be defined by detected accelerations meeting the directional, magnitude, and temporal requirements described herein. In some embodiments, the second user motion may be a single tap of a user's hand against a hand rim of the wheelchair, such as may be defined by a detected acceleration meeting the directional and magnitude requirements described herein.

Embodiments of the present disclosure are also directed to a method for controlling an assistive drive force for a wheelchair. In some embodiments, the method comprises (a) providing a user with an element comprising a sensor that measures acceleration and which is configured to be worn on the user's hand or wrist and (b) using that sensor to activate and/or deactivate an assistive drive force. For instance, the method may comprise activating an assistive drive force in response to sensor data indicating that the user has used his or her hand to double-tap a hand rim of the wheelchair, deactivating an assistive drive force in response to sensor data indicating that the user has used his or her hand to double-tap a hand rim of the wheelchair, or both.

In some embodiments, for instance, the method may comprise activating an assistive drive force in response to the detection of at least a first acceleration and a second acceleration meeting a number of directional, magnitude, and temporal requirements. For instance, the first and second accelerations may each be required to be along an axis that is substantially normal to a user's palm (as can be determined by reference to the wearable element) and to have a threshold magnitude. Additionally, the second detected acceleration may be required to occur within a defined period of time after the first detected acceleration.

The method may also comprise deactivating an assistive drive force in response to the detection of at least a first acceleration and a second acceleration meeting a number of directional, magnitude, and temporal requirements. For instance, the first and second accelerations may each be required to be along an axis that is substantially normal to a user's palm (as can be determined by reference to the wearable element) and to have a threshold magnitude. Additionally, the second detected acceleration may be required to occur within a defined period of time after the first detected acceleration.

In some embodiments, the method may also allow a user to set the level, or speed, of the assistive driving force by a user motion that can be detected by the sensor, e.g. a single tap of a hand against a hand rim of the wheelchair. For instance, after activation of the assistive drive force, the level of the assistive drive force may gradually increase until either a predetermined maximum level is reached or a third distinct acceleration is detected by the sensor, the acceleration being along an axis that is substantially normal to a user's palm and meeting a threshold magnitude.

In some embodiments, a method for activating and deactivating an assistive drive force for a wheelchair may comprise activating an assistive drive force in response to the detection of a first user motion, increasing the level of the assistive drive force until either a maximum level is reached or a second user motion is detected, and deactivating the assistive drive force in response to the detection of a third user motion. The first user motion and the third user motion may be substantially the same. For instance, the first user motion and the third user motion may each comprise a double tap of a user's hand against a hand rim of the wheelchair, such as may be defined by the detection of accelerations meeting the directional, magnitude, and temporal requirements described herein. In some embodiments, the second user motion may be a single of a user's hand against a hand rim of the wheelchair, such as may be defined by a detected acceleration meeting the directional and magnitude requirements described herein.

Certain aspects of the present technology provide a wheelchair having an embodiment of the presently disclosed assistive drive force system.

DETAILED DESCRIPTION

The presently disclosed technology relates generally to an assistive driving system for a manual wheelchair.

Figure 1:
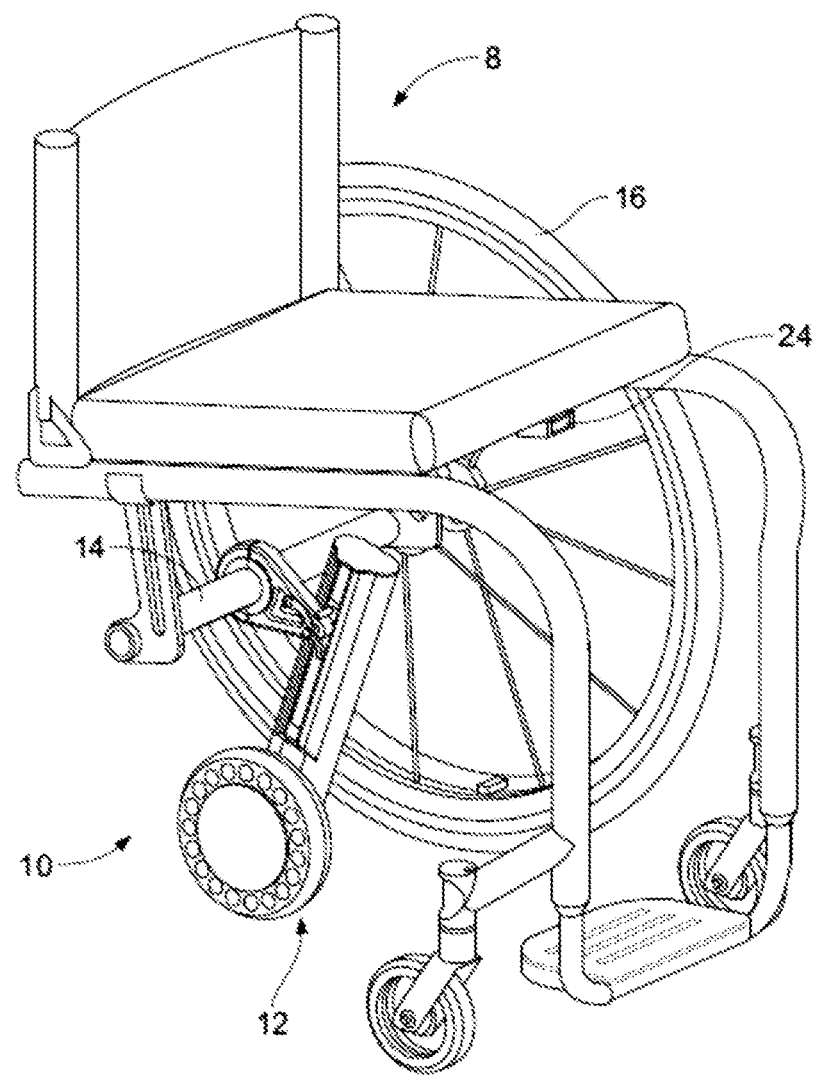
FIG. 1 shows an isometric view of an embodiment of a power assist system comprising a single drive wheel power assist attachment and remote control device mounted to a generic wheelchair. One of the rear wheels is removed for clarity.
Figure 2:
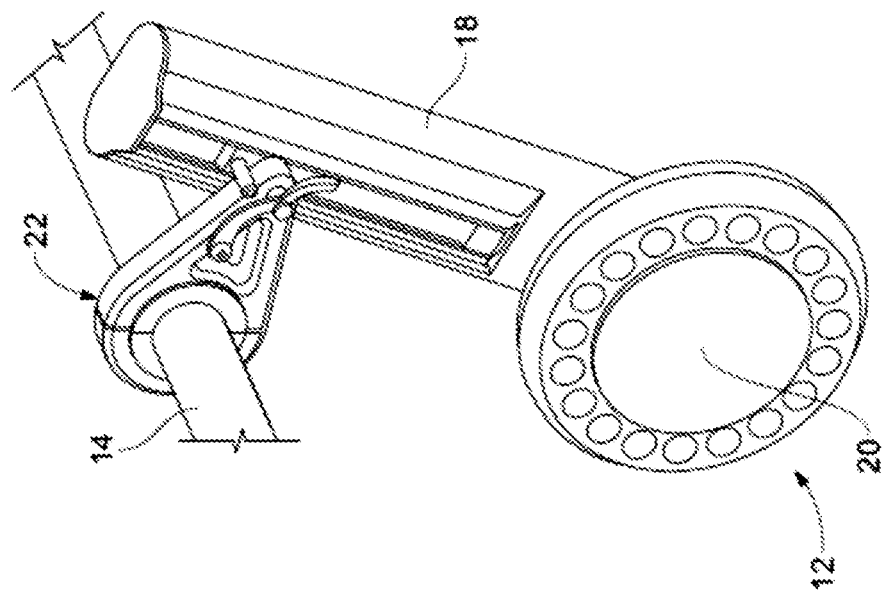
FIG. 2 shows an enlarged view of the single drive wheel power assist attachment of FIG. 1 mounted to the axle bar of a wheelchair frame.

FIGS. 1 and 2 show an embodiment of the power assist system employing the motion-based push activation. The power assist system 10, which in this embodiment comprises a single wheel power assist drive attachment 12, is shown mounted on a generic wheelchair 8, comprising a drive linkage 18, an electric hub drive wheel 20, a mounting attachment 22, and a remote control device 24.

The power assist drive attachment 12 is positioned between the wheelchair drive wheels 16 such that the electric drive wheel 20 contacts the ground at a point midway between the wheelchair drive wheels 16. This positioning prevents the wheelchair from turning or drifting when an assistive force is provided, while not significantly hindering the rotation of the chair when desired for maneuvering. The single wheel power assist attachment 12 and drive linkage 18 are also angled such that as the drive wheel power is increased, the wheel digs into the ground for ideal traction control.

The electric drive wheel 20 mounts to the distal end of the drive linkage 18, which is pivotally attached to the wheelchair axle bar 14 through the mounting attachment 22. While FIG. 1 and FIG. 2 show an embodiment with a singular mount attachment 22, in other embodiments a plurality or multitude of mounting attachments may be used to connect the drive linkage 18 to the wheelchair. In some embodiments, a remote control device 24 may comprise part of the power assist system 10 and be used to turn the unit on/off and modulate between multiple configuration settings for providing different amounts of driving force related to the sensed acceleration of the power assist system from the push of the user.

Figure 3:
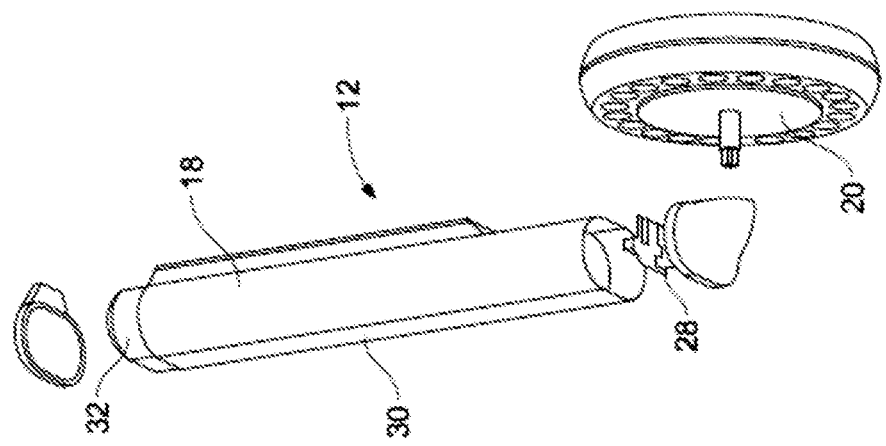
FIG. 3 shows an exploded assembly view of the single drive wheel power assist attachment of FIG. 1 removed from the wheelchair.

An exploded assembly of an embodiment of a power assist drive attachment 12 is shown in FIG. 3, which was originally presented in US Patent Application Publication No. 2013/0008732 A1, the entirety of which is incorporated herein by reference. In this embodiment, the power assist drive system comprises a drive linkage 18 having a shell or frame 30, a battery pack 32, a processor 28, and an electric hub motor 20. The primary role of the processor 28 is to receive measurements, or data, from one or more sensors, process those measurements to determine whether to activate or deactivate an assistive drive force, and then deliver the appropriate amount of power from the battery 32 to the motor 20.

In some embodiments, the power assist system 10 may also comprise motion-based instrumentation that may measure the kinematics of the power assist system. The kinematics measured may include linear velocities, angular velocities, linear accelerations, and angular accelerations. A motion sensing system configured to detect the motion of the power assist system can include inertial measurement units (gyroscopes, accelerometers and magnetometers), rotational position sensors (optical encoders, Hall Effect sensors, or reed switches) in the drive motor 20.

Embodiments of the power assist drive attachment 12, such as those presented in US Patent Application Publication No. 2014/0262575 A1, the entirety of which is incorporated herein by reference, are also contemplated for use with the presently disclosed system. In some embodiments, for example, the battery pack 32 or an extra battery pack may be configured to slide under the seat and connect, via a cord or wire, to the drive linkage 18. Although the embodiment shown in FIG. 3 shows the components of the power assist system 10 incorporated into the drive linkage 18, various components of the power assist system may be incorporated into a unit that is attached to the wheelchair at another location, such as under the seat, as is shown in FIG. 4.

Figure 4:
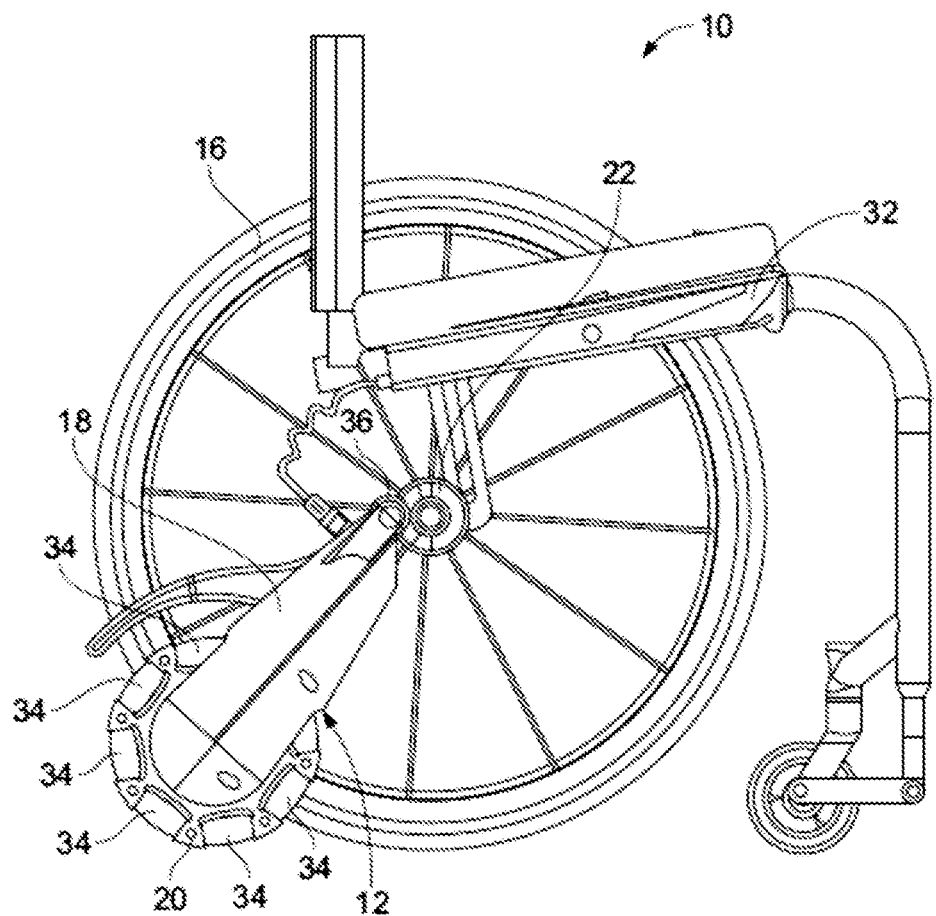
FIG. 4 shows a side view of a wheelchair equipped with a power assist system in accordance with an embodiment of the present technology.

Embodiments of the power assist drive attachment 12 may also comprise a drive unit, such as that shown in FIG. 4, which was originally presented in US Patent Application Publication No. 2014/0262575 A1. For instance, the power assist system can include a drive linkage 18 that can attach to a mounting mechanism 22 (e.g., a mounting attachment or a hitch), which can be attachable to one or more structural elements of a wheelchair. For example, the mounting mechanism 22 can be clamped to a support bar, an axle bar, or the like. In some embodiments, the mounting mechanism may be an expanding connector bar that is attachable and detachable to one or more structural elements of the wheelchair. The drive linkage 18 can be attachable and detachable from the mounting mechanism 22 via a hinge 36, for example.

The drive wheel 20 can include multiple lateral rollers 34 positioned radially about the circumference of the drive wheel 20. The lateral rollers 34 can be rotatable about an axis that is tangential to the circumference of the drive wheel 20 such that, when the drive wheel is placed on a surface, the drive wheel can freely slide in a direction parallel to the rotational axis of the drive wheel. Because the lateral rollers 34 rotate freely about an axis tangential to the circumference of the drive wheel 20, the drive wheel can slide in a direction parallel to the center axis of the drive wheel while in contact with the ground. The lateral rollers 34 can also provide traction between the drive wheel 20 and the ground when the drive wheel is driving or rolling about the center axis of the drive wheel. In some embodiments, the drive wheel 20 can also include more than one wheel. For instance, the drive wheel 20 may, in some embodiments, comprise two wheels, with one or both of the wheels having lateral rollers 34.

Figure 5:
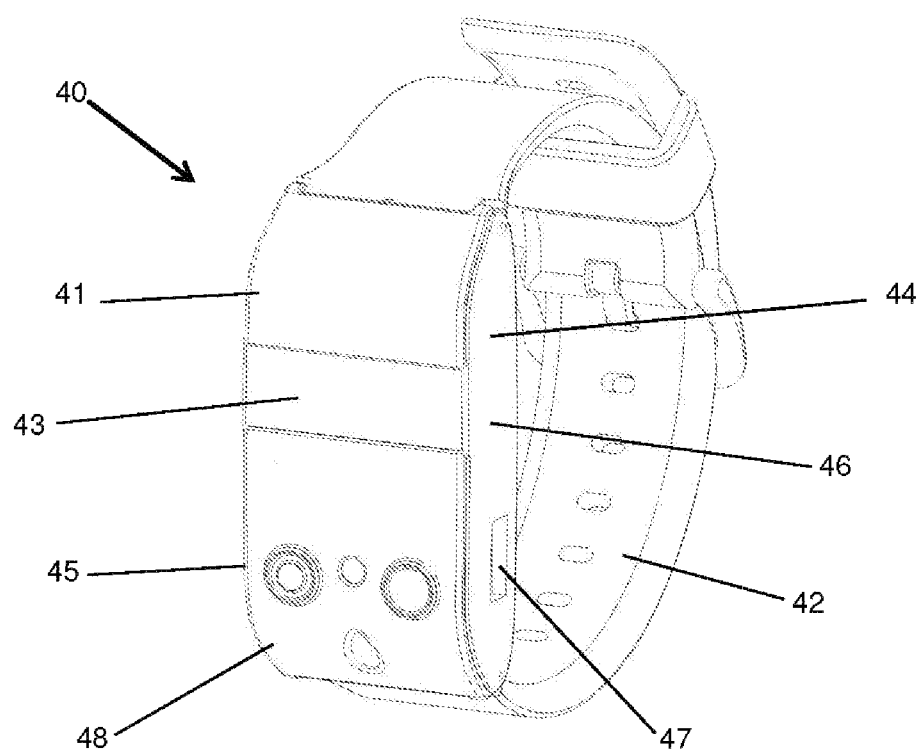
FIG. 5 shows a perspective view of an embodiment of a wearable element configured to be worn on a user's wrist.

With reference to FIG. 5, in addition to the power assist system 10, embodiments of the presently disclosed technology include an element configured to be worn on a user's hand or wrist 40. The wearable element 40 comprises one or more sensors 41 configured to measure acceleration. The one or more sensors 41 comprises at least one accelerometer. The accelerometer may be configured to measure linear acceleration along one or more axes and/or angular accelerations. For example, in some embodiments, the wearable element 40 may comprise an accelerometer that measures linear acceleration only along one axis, which will be referred to herein as the z-axis. In other embodiments, the wearable element 40 may comprise a three-axis accelerometer, which is capable of measuring linear acceleration along each of an x-axis, a y-axis, and a z-axis. In yet other embodiments, the wearable element 40 may comprise an accelerometer configured to work in combination with a gyroscope or the like to measure angular accelerations. In some embodiments, the wearable element 40 may also include one or more additional sensors, such as one or more gyroscopes, magnetometers, or combinations thereof, which may be used to obtain additional information about a user's hand movements.

In wearable element 40 may be configured to be worn by a user on the hand or wrist in a variety of ways. In some embodiments, the wearable element 40 may comprise a wristband 42. For example, in some embodiments the wearable element 40 can comprise a compliant band that is stretchable and/or bendable, which makes it easy to take the wristband on and off. The wristband can also have a non-slip portion on an inner surface designed to keep the wristband from unintended movement on the wearer (unintended movement may introduce undesirable noise into the detected accelerations). For example, the non-slip portion can comprise a material such as rubber that provides friction between the wristband and the arm/wrist of a wearer, preferably without sacrificing comfort to the wearer. In some embodiments, the wristband 42 may comprise a clasp or other mechanism for securing the wristband to a wearer's arm. And in some embodiments, the one or more sensors 41 and the other optional components of the wearable element 40 may be incorporated into a wristwatch (e.g. a smartwatch) or an existing wristband such as a bracelet or armlet. In other (non-illustrated) embodiments, the wearable element 40 may comprise a glove.

In some embodiments, the wearable element 40 may also comprise a touchscreen 43 or other such user interface, e.g. the combination of a display such as a screen and one or more user input elements such as buttons. The wearable element 40 may also comprise a processor 44. The touchscreen 43 may be configured to work in combination with processor 44 and/or 28 so that a user may control the power assist system 10 in any of a variety of ways. For instance, the processor 44 and/or 28 may be configured to receive input from the touchscreen 43 or other user input element related to the level of the assistive drive force. In some embodiments, for instance, a user may use the touchscreen 43 or other user input element to set a tap sensitivity level, i.e. to adjust the threshold magnitude that must be detected in order to activate and/or deactivate an assistive drive force. A user may also use the touchscreen 43 or other user input element to set a predetermined level for an assistive drive force (i.e. a pre-set speed for the wheelchair), the degree of the acceleration provided by the power assist system upon activation (i.e. the rate at which the assistive drive force increases the speed of the wheelchair), or both. The touchscreen 43 or other display element may also be configured to provide a user with information relating to a push-tracking system, such as the number of manual pushes performed within a defined time period or the like.

Furthermore, in some embodiments, the touchscreen 43 or other user interface may be configured so that a user may activate an assistive drive force, deactivate an assistive drive force, or both. In some embodiments, for instance, a user may simply double tap a finger against the touchscreen 43 or other user interface (or alternatively interact with the touchscreen in some other manner) in order to deactivate an assistive drive force. This may provide a user with an additional way to deactivate an assistive drive force, which may function as a safety feature should the user become incapable of performing a motion measurable by sensor 41, e.g. a double-tap of the hand against the hand rim, to signal a deactivation.

In some embodiments, the wearable element 40 may also comprise a heartrate sensor 45. The heartrate sensor 45 may be configured to provide data that can be used by the system to provide a number of additional features, including but not limited to safety features. In some embodiments, the heartrate sensor 45 may be used to ensure that the user is wearing element 40 in order to activate and/or maintain an assistive drive force. For example, the system may be configured so that if a heartrate is not detected by the heartrate sensor, the motor may be locked and/or shut down, in order to prevent unintentional activation when the wearable element 40 is not worn by the user and/or prevent a potentially dangerous situation should the wearable element be dislodged or removed from the user during a period when the drive assist system is activated. In some embodiments, before an assistive drive force is activated, the system may verify that a heartrate is present, for instance to ensure that the wearable element 40 is in fact being worn by the user. Similarly, in some embodiments, when an assistive drive force is active, the system may verify that a heartrate is present either continuously or at regular intervals and deactivate the assistive drive force if none is sensed. Moreover, in some embodiments, the system could be configured to deactivate an assistive drive force and/or to apply a brake in response to a detected spike in a user's heartrate.

The wearable element 40 may also comprise a power source, such as a battery or battery pack 46. In some embodiments, the wearable element 40 may also comprise a port 47 to which a cable may be attached to recharge the battery 46.

The wearable element 40 may also be configured to communicate with the power assist system 10. For example, in embodiments of the present technology, the wearable element 40 may be configured to transmit sensor measurement data to the power assist system 10 using wireless communication technology. The type of wireless communication technology is not limited and may be selected from those generally known in the art, such as Wi-Fi, BLUETOOTH® (short-range radio frequency wireless technology) or other radio wave-based wireless, induction wireless, infrared wireless, ultra wideband (UWB), or the like. Accordingly, in some embodiments, the wearable element 40 may comprise a wireless transmitter 48. In some embodiments, for example, the wireless transmitter 48 may be incorporated into a circuit board that also comprises the one or more sensors 41. In some embodiments, the wearable element 40 may also be configured to transmit information to the power assist system 10 through a wired connection between the power assist system and the wearable element.

In some embodiments, the wearable element 40 may be configured to transmit the raw sensor data to the power assist system 10, whereby the data may be processed by processor 28 in order to determine whether to activate an assistive drive force, deactivate an assistive drive force, increase the level of an assistive drive force, decrease the level of an assistive drive force, lock in a level for an assistive drive force, or the like. In other embodiments, the wearable element 40 may comprise a processor 44 configured to process the raw sensor data prior to transmission to the power assist system 10. For instance, in some embodiments, processor 44 may determine whether to activate an assistive drive force, deactivate an assistive drive force, increase the level of an assistive drive force, decrease the level of an assistive drive force, lock in a level for an assistive drive force, or the like, and then transmit an appropriate signal to the power assist system 10 (e.g. to deliver the appropriate amount of power from the battery 32 to the motor 20).

It is contemplated that, in some embodiments, each of a first wearable element 40, configured to be worn on a user's first (e.g., right) wrist or hand, and a second wearable element, configured to be worn on a user's second (e.g., left) wrist or hand, could be provided. In many embodiments, however, the system may only include a wearable element 40, since a user will typically easily learn to use a single hand for the motions necessary to activate and/or deactivate the assistive drive force. In some embodiments, the wearable element 40 may be configured to be worn on either a user's right hand or a user's left hand, allowing one to use the sensor with either hand.

The system may be configured to activate an assistive drive force in response to a particular user motion detected by the one or more sensors 41, deactivate an assistive drive force in response to a particular user motion, or both. In some embodiments, the user motion used to activate the power assist system 10 may be the same as the user motion used to deactivate the power assist system. In other words, when no assistive drive force is active, the user motion will signal that a user wishes to activate an assistive drive force; however, when an assistive drive force is active, the user motion will signal that a user wishes to deactivate that assistive drive force. The use of the same user motion to both activate and deactivate the power assist system 10 provides an additional benefit of being intuitive and easy for a user to remember. In some embodiments, the system may be configured so that the user motion that both activates and deactivates the power assist system 10 is a double-tap of a user's hand against a hand rim of a wheelchair. In other embodiments, the system may be configured so that the user motion that activates and/or deactivates the power assist system 10 is a single-tap of a user's hand against a hand rim of a wheelchair.

In some embodiments, the system may be configured so that a user may activate and/or deactivate an assistive drive force by a double-tap of the user's hand against a hand rim of the wheelchair. This may be achieved by configuring the system to process the data from sensor 41 to ensure that the detected accelerations meet at least three requirements: a directional requirement, a magnitude requirement, and a temporal requirement.

Regarding the directional requirement, the processor may be configured to determine if a measured acceleration is along an axis substantially normal to a user's palm. This may be facilitated by positioning of the one or more sensors 41 (e.g. the one or more accelerometers) in the wearable element 40 and providing that the wearable element is worn in a repeatable orientation. For instance, where the wearable element comprises a wristband 42, it may be important that the wristband be worn by a user in a repeatable manner so that the one or more sensors are positioned in substantially the same location every time that the wristband is worn. This may be achieved, for instance, by providing a touchscreen 43 or some other component or marking that is to be worn on the upper side of a user's wrist. This may also be achieved, for instance, by providing a clasp or some other component or marking that is to be worn on the lower side of a user's wrist. By ensuring that the wristband 42 will repeatedly be worn in substantially the same orientation, an axis that is substantially normal to a user's palm may be defined solely in relation to the wearable element itself. For instance, if a touchscreen 43 is positioned at the top of a user's wrist, then an axis that is substantially normal to a user's palm is equivalent to an axis that is substantially normal to the touchscreen.

In some embodiments, the wearable element 40 may be configurable so that a user may select a preferred orientation at which to wear the element. The system may be configured so that the user identifies his or her preferred orientation. For instance, in some embodiments, the user may select from a list of potential orientations. Alternatively, the system may be configured to determine the orientation of the wearable element 40 once the user puts it on. In some embodiments, for example, the user may be prompted to position or move his or her hand in a certain way, from which the system can determine the orientation of the wearable element 40.

Figure 6:
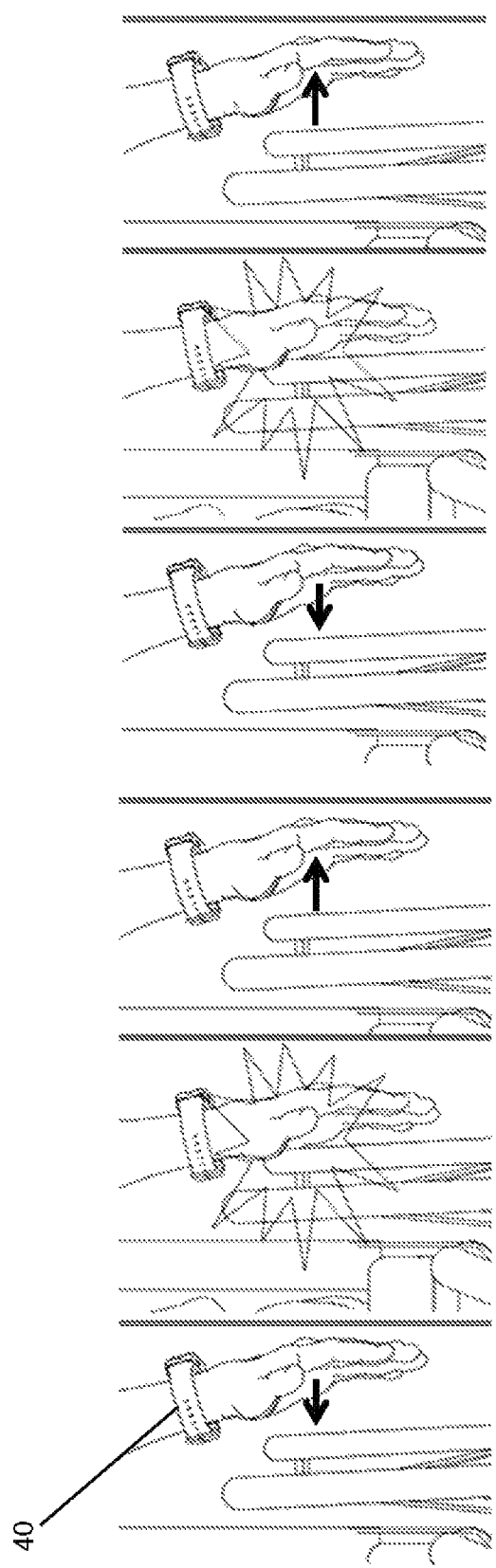
FIG. 6 shows a user motion corresponding to a double tap of a user's hand against the hand rim of a wheelchair.
Figure 7:
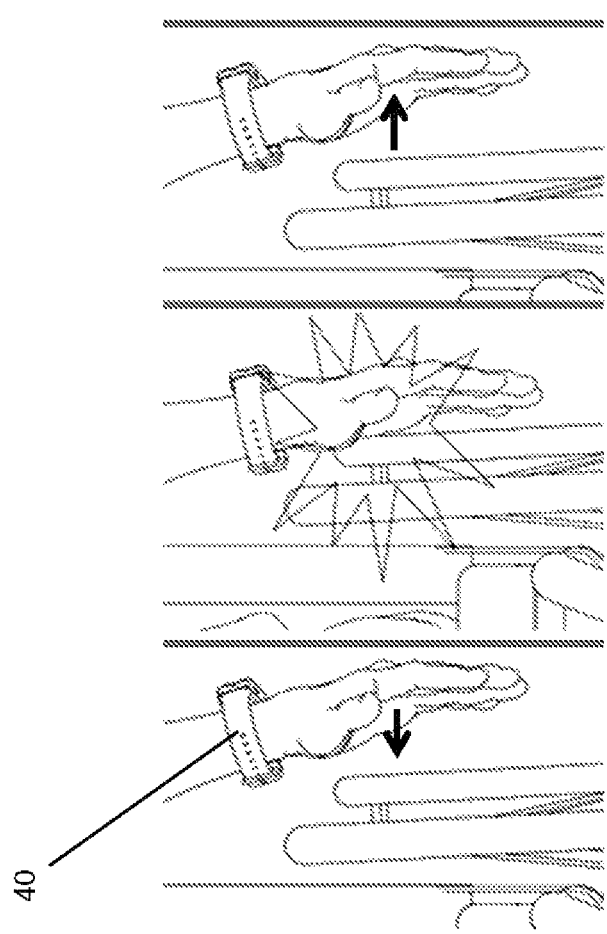
FIG. 7 shows a user motion corresponding to a single tap of a user's hand against the hand rim of a wheelchair.

As shown, for example, in FIG. 6, when a user taps his or her hand against a hand rim of a wheelchair, the user moves his or her hand along an axis that is substantially normal to the user's palm. Accordingly, the system is configured to require that the detected acceleration correspond with that axis.

In some embodiments, the one or more sensors 41 may comprise a three-axis accelerometer or an angular accelerometer. The axis that is substantially normal to a user's palm is referred to herein as the z-axis. In some embodiments, accelerations measured along the other two axes, i.e. the x-axis and the y-axis, or different angular accelerations may be processed to determine when a user has performed a manual push. That information may be stored in an optional system memory, allowing the wearable element to also function as a push tracker by, for example, tracking the number of manual pushes that a user performs over a defined time period (such as within a day). In some embodiments, the one or more sensors 41 may comprise an angular accelerometer, which can be configured to detect additional movement data which may be utilized to determine whether the directional requirement has been met.

Regarding the magnitude requirement, the processor may be configured to determine whether the detected acceleration meets a threshold magnitude. Requiring a threshold magnitude ensures that incidental user movements do not register as signals to activate and/or deactivate an assistive drive force. In some embodiments, the threshold magnitude may be between about 1 g and about 5 g, alternatively between about 2 g and about 4 g (with g being gravitation force, i.e. the g-force measured by the accelerometer(s)).

In some embodiments, the threshold magnitude may be fixed, e.g. the processor may be programmed with a particular threshold magnitude. In other embodiments, however, the threshold magnitude may be variable. In some embodiments, for instance, the threshold magnitude may be set by a user. In this way, the system may be provided with a desired degree of sensitivity. It may be particularly useful, for instance, to set the threshold magnitude at a relatively low value where the user has limited arm and/or hand movement. On the other hand, an extremely active user may desire a relatively high threshold magnitude. In some embodiments, for instance, the user may simply set a threshold magnitude using the touchscreen feature of the wearable element. If, through either trial and error or a testing program run by the processor, that value is deemed either too low or too high, the user may readily and easily increase or decrease the value until an optimum sensitivity for that particular individual is obtained.

In some embodiments, each of the accelerations may be in a direction away from the user. As illustrated in FIG. 6, when a user taps his or her hand against the hand rim of a wheelchair, the motion involves the following: (a) an acceleration of the hand in a direction toward the hand rim (and thus toward the user) as the user moves his/her hand toward the hand rim; (b) a brief moment where there is no movement along the z-axis, i.e. the moment of the tap; and (c) a rebound acceleration of the hand in a direction away from the hand rim (and thus away from the user) as the user's hand springs back after the tap. It has been found that the rebound acceleration generally has a greater, and more consistent, magnitude than the initial acceleration toward the hand rim. Therefore, in some embodiments it may be desirable to utilize the acceleration in the direction away from the hand rim (and thus away from the user) in registering a signal to activate and/or deactivate an assistive drive force. For instance, the threshold magnitude described herein may be required to be in a direction away from the hand rim (and thus away from the user). This can be achieved, for example, by ensuring that the wearable element 40 is in a known orientation on the user, in which case the acceleration may be substantially parallel with a vector extending outward from the top surface of a user's hand in a direction substantially normal to the top surface of the user's hand.

Regarding the temporal requirement, the processor may be configured to determine if a first measured acceleration and a second measured acceleration were within an appropriate predefined timeframe to be produced by a double tap of a user's hand against the hand rim. For instance, in some embodiments, it may be required that the second acceleration occur within 5 seconds of the first acceleration, alternatively within 4 seconds of the first acceleration, alternatively within 3 seconds of the first acceleration, alternatively within 2.5 seconds of the first acceleration, alternatively within 2 seconds of the first acceleration, alternatively within 1.75 seconds of the first acceleration, alternatively within 1.5 seconds of the first acceleration, alternatively within 1 second of the first acceleration. For example, it may be required that the second acceleration is between about 1 millisecond and about 5 seconds after the first acceleration, alternatively between about 1 millisecond and about 4 seconds after the first acceleration, alternatively between about 1 millisecond and about 3 seconds after the first acceleration, alternatively between about 1 millisecond and about 2.5 seconds after the first acceleration, alternatively between about 1 millisecond and about 2 seconds after the first acceleration, alternatively between about 1 millisecond and about 1.75 seconds after the first acceleration, alternatively between about 1 millisecond and about 1.5 seconds after the first acceleration, alternatively between about 1 millisecond and about 1 second after the first acceleration.

In some embodiments, the predefined timeframe may be fixed, meaning that the system is configured to require that the second acceleration be within a fixed interval after the first acceleration to meet the temporal requirement. In other embodiments, however, the predefined timeframe may be adjustable, meaning that a user may select and adjust the timeframe in order to suit personal preferences and/or abilities. In some embodiments, for instance, a user may simply select a desired timeframe. Alternatively, the system may be configured to calculate an appropriate timeframe to suit a user's personal preferences and/or abilities. For instance, the system may be configured to determine an appropriate timeframe after having a user perform one or more training motions.

While the recognition of a double-tap has been described as requiring at least a directional requirement, a magnitude requirement, and a temporal requirement, it is also contemplated that additional requirements may be utilized. It is also contemplated that in other embodiments, the system could be configured so that only two of the three requirements are necessary, for instance the combination of a directional requirement and a temporal requirement, the combination of a directional requirement and a magnitude requirement, or the combination of a temporal requirement and a magnitude requirement.

In addition to the system being configured to activate an assistive drive force in response to a particular user motion detected by the one or more sensors 41, deactivate an assistive drive force in response to a particular user motion, or both, the system may also be configured so that a user may easily set the level of the assistive drive force (i.e. the speed that is maintained by the power assist system). In some embodiments, the level of the assistive drive force may simply be preset by a user, e.g. by interaction with a touchscreen on the wearable element. In other embodiments, however, the level of the assistive drive force may be set by a user after the power assist system is activated. For instance, in some embodiments, upon activation of the power assist system, the power assist system will cause the wheelchair to accelerate until either (a) a maximum speed (which may either be as limited by the power assist system or preset by a user) is reached or (b) a user signals to the system that a desired speed has been reached.

A user may signal to the system that a desired speed has been reached in a number of ways.

In some embodiments, for instance, a user may interact with the wearable element in order to signal that the power assist system has achieved an assistive drive force of a desired level. For example, a user may tap a finger against the touchscreen of the wearable element once a desired speed has been reached. The processor may register that input and respond by locking the level of the assistive drive force at the level present when the tap occurred.

In some embodiments, the system may be configured to lock in a desired level for the assistive drive force in response to a particular user motion detected by the one or more sensors 41. For example, the system may be configured so that a user may signal that a desired level of assistive drive force has been reached by a single-tap of the user's hand against a hand rim of the wheelchair. This may be achieved by configuring the system to process the data from sensor 41 to ensure that the detected acceleration meets at least a directional requirement and a magnitude requirement. The directional and magnitude requirements may entail any of the details described above with respect to the detection of a double-tap.

When the system is configured so that both (a) a double-tap of the user's hand is used to activate the power assist system and (b) a single-tap of the user's hand is used to set the speed of the power assist system, the single-tap may be characterized by a third detected acceleration (the first and second detected accelerations being provided by the double-tap that activates the power assist system). Accordingly, upon activation of the assistive drive force, the level of the assistive force may gradually increase, i.e. the wheelchair may gradually accelerate, until a third acceleration is detected. The combined use of a double-tap to activate the power assist system and a single-tap to set the speed of the assistive drive force provides an easy to remember and simply to execute manner for a user to control the system. Indeed, after a short period of time, a user will begin to perform the required motions naturally.

As described herein, in some embodiments, the user motion that is used to activate the power assist system 10 may be the same user motion that is used to deactivate the power assist system. For example, in some embodiments, a user may double-tap the hand rim of the wheelchair to activate the power assist system 10 and then double-tap the hand rim again in order to deactivate the assistive drive force.

While this provides a system that uses a single natural and easy to remember movement, it may give rise to a potential problem if a user incorrectly believes that a double-tap was not detected by the system and repeats the motion, i.e. immediately double-taps the hand rim of the wheelchair again. In most instances, proper instruction and user familiarity will be sufficient to prevent this from occurring. However, in some instances, it may be desirable to provide an additional safeguard to ensure that a user attempting to deactivate the power assist system does not accidentally re-activate the power assist system immediately after deactivating it. Accordingly, in some embodiments, the system may be configured so that once an assistive drive force is deactivated, the power assist system cannot be re-activated (at least in response to the user motion) for a defined period of time. For instance, in some embodiments, after the power assist system is deactivated, it cannot be re-activated by a user motion, e.g. a double-tap, for at least 2 seconds, alternatively at least 5 seconds, alternatively at least 7 seconds, alternatively at least 10 seconds, alternatively at least 15 seconds, alternatively at least 20 seconds, alternatively at least 25 seconds, alternatively at least 30 seconds. In contrast, because it is generally not desirable to limit the ability of a user to deactivate the assistive drive force, a double-tap at any time may serve to deactivate the power assist system when an assistive drive force is being provided.

In some embodiments, the system may also comprise one or more safeguards to ensure that the power assist system is not inadvertently activated by a user when the user is not sitting in the wheelchair. For instance, the system may utilize one or more proximity sensors. For instance, the wearable element 40 and/or the power assist system 10 may comprise one or more proximity sensors.

In some embodiments, the system can be configured to be programmable, such that the system could be tailored to a specific individual. In this way, the system may be configured to most accurately register the data from the one or more sensors 41. The system may also comprise a "smart" system, i.e. be configured to use data from the one or more sensors 41 in order to "learn" which sensor data is most representative of a particular user motion for a particular user.

The wearable element 40 may also comprise any number of additional components, each of which may provide the presently disclosed technology with additional functionality and user benefits. In some embodiments, for example, the wearable element 40 may include one or more user notification components. The one or more user notification components may be configured to notify a user when the particular user motion, e.g. a double-tap, has been recognized and thus when an assistive drive force has been activated and/or deactivated. The one or more user notification components may also notify a user when a battery—either the battery of the power assist system 32, the battery of the wearable element 46, or both—is low. The one or more user notification components may comprise a light indicator for providing a visual indication, a speaker for providing an auditory indication, a vibrating indicator for providing a physical indication, or any combination thereof.

The wearable element 40 may also comprise an on/off switch by which a user may turn the wearable element on for use and off so as to save battery life. The on/off switch may be located at a position on the wearable element that can be conveniently accessed by a user. The wearable element may also comprise one or more ports 47 by which the wearable element may be plugged into a power source in order to recharge the battery 46. In some embodiments, the wearable element 40 may also comprise one or more ports by which the wearable element can be connected to the power assist system 10 using a wired connection. A wired connection may be used either in place of a wireless connection or as an alternative, e.g. a back-up connection, to a wireless connection.

In some embodiments, the wearable element 40 may also comprise one or more protective layers. For example, wearable element 40 may comprise a moisture-sealing layer, which protects the electrical components of the sensor from moisture that may enter the enclosure through contact with the skin, precipitation, the spilling of fluids, and the like. In some embodiments, for example, the wearable element 40 may be configured to have water-resistant or water-proof properties.

The present technology has now been described in such full, clear, concise and exact terms as to enable any person skilled in the art to which it pertains, to practice the same. It is to be understood that the foregoing describes preferred embodiments and examples of the present technology and that modifications may be made therein without departing from the spirit or scope of the invention as set forth in the claims. Moreover, it is also understood that the embodiments shown in the drawings, if any, and as described above are merely for illustrative purposes and not intended to limit the scope of the invention. As used in this description, the singular forms "a," "an," and "the" include plural reference such as "more than one" unless the context clearly dictates otherwise. Finally, all references cited herein are incorporated in their entirety.

What is claimed:

1. A method for delivering an assistive drive force to a wheelchair, comprising:
   providing a user with an element configured to be worn on the user's hand or wrist and comprising a sensor configured to measure acceleration;
   activating the assistive drive force in response to sensor data indicating that the user has double-tapped a hand against a hand rim of the wheelchair, wherein the indication that the user double-tapped a hand against the hand rim is based on measuring the acceleration of the element away from the hand rim;
   deactivating the assistive drive force in response to sensor data indicating that the user has double-tapped the hand against the hand rim of the wheelchair, wherein once the assistive drive force is deactivated, the assistive drive force cannot be reactivated in response to user motion for a defined period of time.

2. The method of claim 1, wherein the assistive drive force is provided by a power assist system attached to a non-motorized wheelchair.

3. The method of claim 2, wherein data from the sensor is wirelessly sent to the power assist system.

4. A method for activating and deactivating an assistive drive force to a wheelchair, comprising:
   providing a user with a wearable element comprising one or more sensors configured to detect motion of the user's hand;
   detecting user motions with the one or more sensors; and
   (a) activating the assistive drive force in response to the detection of a first user motion;
   (b) increasing a level of the assistive drive force until the detection of a second user motion; and (c) deactivating the assistive drive force in response to the detection of a third user motion, wherein once the assistive drive force is deactivated, the assistive drive force cannot be reactivated in response to user motion for a defined period of time.

5. The method of claim 4, wherein the first user motion and the third user motion are substantially the same.

6. The method of claim 5, wherein the first user motion and the third user motion each comprise a double tap of the user's hand against a hand rim of the wheelchair.

7. The method of claim 6, wherein the second user motion comprises a single tap of the user's hand against the hand rim of the wheelchair.

8. The method of claim 4, wherein the assistive drive force is provided by a power assist system attached to a non-motorized wheelchair.

9. The method of claim 8, wherein data from the one or more sensors is wirelessly sent to the power assist system.

10. A power assist system having a motorized drive wheel and being configured to deliver an assistive drive force to a wheelchair having two manually powered drive wheels, wherein the assistive drive force is delivered in response to detection of user motions by one or more sensors, the one or more sensors being provided on a wearable element and configured to detect the motion of the user's hand,
wherein the power assist system is configured to:
(a) activate the assistive drive force in response to the detection of a first user motion;
(b) increase a level of the assistive drive force until the detection of a second user motion; and
(c) deactivate the assistive drive force in response to the detection of a third user motion; wherein once the assistive drive force is deactivated, the assistive drive force cannot be reactivated in response to user motion for a defined period of time.

11. The power assist system of claim 10, wherein the first user motion and the third user motion are substantially the same.

12. The power assist system of claim 11, wherein the first user motion and the third user motion each comprise a double tap of the user's hand against a hand rim of the wheelchair.

13. The power assist system of claim 12, wherein the second user motion comprises a single tap of the user's hand against the hand rim of the wheelchair.

14. The power assist system of claim 10, wherein data from the one or more sensors is wirelessly sent to the power assist system.

15. A method for delivering an assistive drive force to a wheelchair, comprising:
providing a user with an element configured to be worn on the user's hand or wrist and comprising a sensor configured to measure acceleration;
activating the assistive drive force in response to sensor data indicating that the user has double-tapped a hand against a hand rim of the wheelchair, wherein the indication that the user double-tapped a hand against the hand rim is based on measuring the acceleration of the element away from the hand rim, further including providing a proximity sensor in the element that determines whether or not the user is sitting in the wheelchair, and, if the user is not sitting in the wheelchair, preventing activation of the assistive drive force by motion of the user when the user is not sitting in the wheelchair.

16. The method of claim 15, wherein the assistive drive force is provided by a power assist system attached to a non-motorized wheelchair.

17. A method for activating and deactivating an assistive drive force to a wheelchair, comprising:
providing a user with a wearable element comprising one or more sensors configured to detect motion of the user's hand;
detecting user motions with the one or more sensors; and
(a) activating the assistive drive force in response to the detection of a first user motion;
(b) increasing a level of the assistive drive force until the detection of a second user motion; and
(c) deactivating the assistive drive force in response to the detection of a third user motion; further including providing a proximity sensor in the element that determines whether or not the user is sitting in the wheelchair, and, if the user is not sitting in the wheelchair, preventing activation of the assistive drive force by motion of the user when the user is not sitting in the wheelchair.

18. The method of claim 17, wherein the first user motion and the third user motion are substantially the same.

19. The method of claim 18, wherein the first user motion and the third user motion each comprise a double tap of the user's hand against a hand rim of the wheelchair.

20. The method of claim 19, wherein the second user motion comprises a single tap of the user's hand against the hand rim of the wheelchair.

\* \* \* \* \*